United States Patent [19]

Okuyama et al.

[11] 4,328,454
[45] May 4, 1982

[54] APPARATUS FOR CONTROLLING AC MOTOR

[75] Inventors: Toshiaki Okuyama, Ibaraki; Hiroshi Nagase, Hitachi, both of Japan

[73] Assignee: Hitachi, Ltd., Tokyo, Japan

[21] Appl. No.: 109,845

[22] Filed: Jan. 7, 1980

[30] Foreign Application Priority Data

Jan. 10, 1979 [JP] Japan ............................. 54-667

[51] Int. Cl.³ .............................................. H02P 5/34
[52] U.S. Cl. ...................................... 318/803; 363/37; 363/79
[58] Field of Search .......................... 363/37, 41, 79; 318/800, 801, 803, 811

[56] References Cited

U.S. PATENT DOCUMENTS 4,158,163 6/1979 Eriksen et al. ................. 363/37 X
4,188,663 2/1980 Okawa et al. .................. 363/37 X
4,238,821 12/1980 Walker ........................... 363/37 X

FOREIGN PATENT DOCUMENTS 52-46415 4/1977 Japan ................................ 318/800

Primary Examiner—William M. Shoop
Attorney, Agent, or Firm—Craig and Antonelli

[57] ABSTRACT

A first PWM inverter for converting the ac voltage of an ac power source to a dc voltage is connected through a dc circuit with a second PWM inverter for driving an ac motor. A smoothing capacitor is provided in the dc circuit. The firing angles of the first inverter are so controlled that the voltage in the dc circuit may be kept at a predetermined value and the second inverter is controlled in accordance with the speed instruction signal for the ac motor, whereby the ac motor can operate a regenerative operation without inducing higher harmonic components.

3 Claims, 14 Drawing Figures

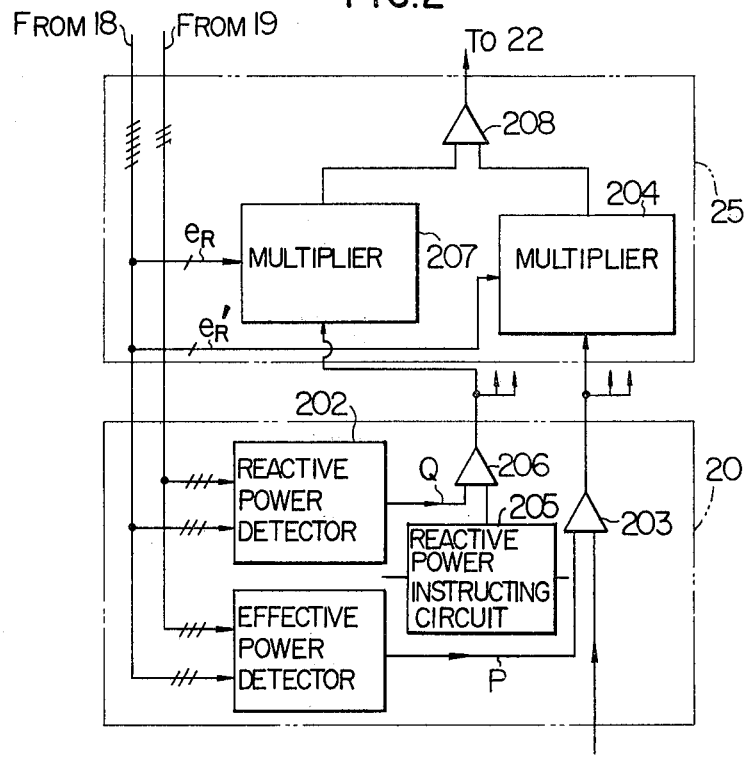
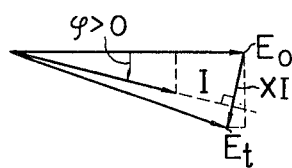
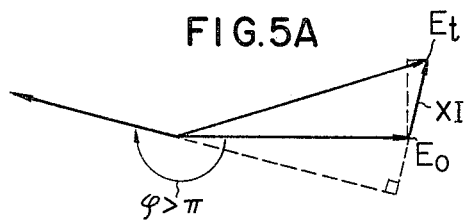
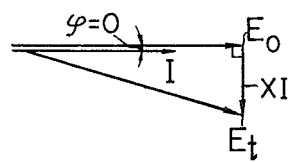
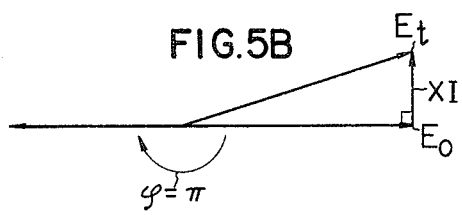

APPARATUS FOR CONTROLLING AC MOTOR

This invention relates to an apparatus for controlling an ac motor driven by a pulse width modulation type inverter which can invert a dc voltage to an ac voltage with variable amplitude and variable frequency, and more particularly to an apparatus for controlling an ac motor which can perform both motor operation and regenerative operation and has an improved power factor at receiving end.

As well known, an ac motor is usually driven by a pulse width modulation type inverter (hereinafter referred to simply as a PWM inverter).

In a voltage source type PWM inverter, the amplitude of the output voltage can be varied through the control of firing angles. Namely, such an inverter itself has a function or regulating output voltages. Accordingly, a converter on the power source side which supplies dc power to the inverter, need not have a function of regulating its output voltage and therefore a diode bridge circuit may be used as the converter on the power source side.

Moreover, the PWM inverter can perform the instantaneous control of the output voltage so that the output voltage can be controlled to have a sinusoidal waveform. This leads to a merit that the motor driven by the PWM inverter generates no torque ripple.

In the conventional case where an ac motor is driven by such a PWM inverter as described above, a diode bridge circuit is used as a converter on the power source side. This state of art is disclosed in, for example, the literature: E. A. Skogsholm, "EFFICIENCY AND POWDER FACTOR FOR A SQUARE WAVE INVERTER DRIVE", IEEE IAS Anuual (1978) pp. 463–469, FIG. 3(b).

With this constitution, however, although the power factor at the receiving end is approximately 1.0, there arises a problem that the regenerative operation cannot be performed and also that the output current has a rectangular waveform which contains higher harmonic components.

The regenerative operation can be effected by using as the power source side converter a thyristor bridge circuit in an inverse parallel configuration. However, this constitution has a drawback that the power factor at the receiving end is lowered, higher harmonic waves are generated and the circuit as a whole becomes complicated.

One object of this invention is to provide an apparatus for controlling an ac motor, which can perform a regenerative operation and has an improved power factor at the receiving end.

Another object of this invention is to provide an apparatus for controlling an ac motor, which can easily perform a regenerative operation.

According to one of the features of this invention, voltage source type PWM inverters are used as a converter on the power source side for converting an ac voltage to a direct current and as an inverter on the motor side for supplying an alternating current having variable voltage and frequency to the motor, and the anodes and the cathods of the thyristors constituting the converter and the inverter are respectively connected in common with each other.

According to another feature of this invention, the voltage of the dc circuit is controlled to a predetermined value by controlling the firing angles of the thyristors in the power side converter and the input alternating current (supplied from the power source) to the converter is so controlled as to have the same phase with the power source voltage.

Other objects, features and advantages of the present invention will become apparent from the following detailed description of preferred embodiments thereof taken in conjunction with the accompanying drawings, in which:

FIG. 2 shows in detail parts of the circuit shown in FIG. 1;

FIGS. 4A, 4B, 5A and 5B are vector diagrams useful in explaining the operation of the embodiment of this invention.

FIG. 1 shows the circuit of a control apparatus as an embodiment of this invention, in which a PWM inverter comprises gate turn-off thyristors (hereinafter referred to simply as GTO's).

Figure 1:
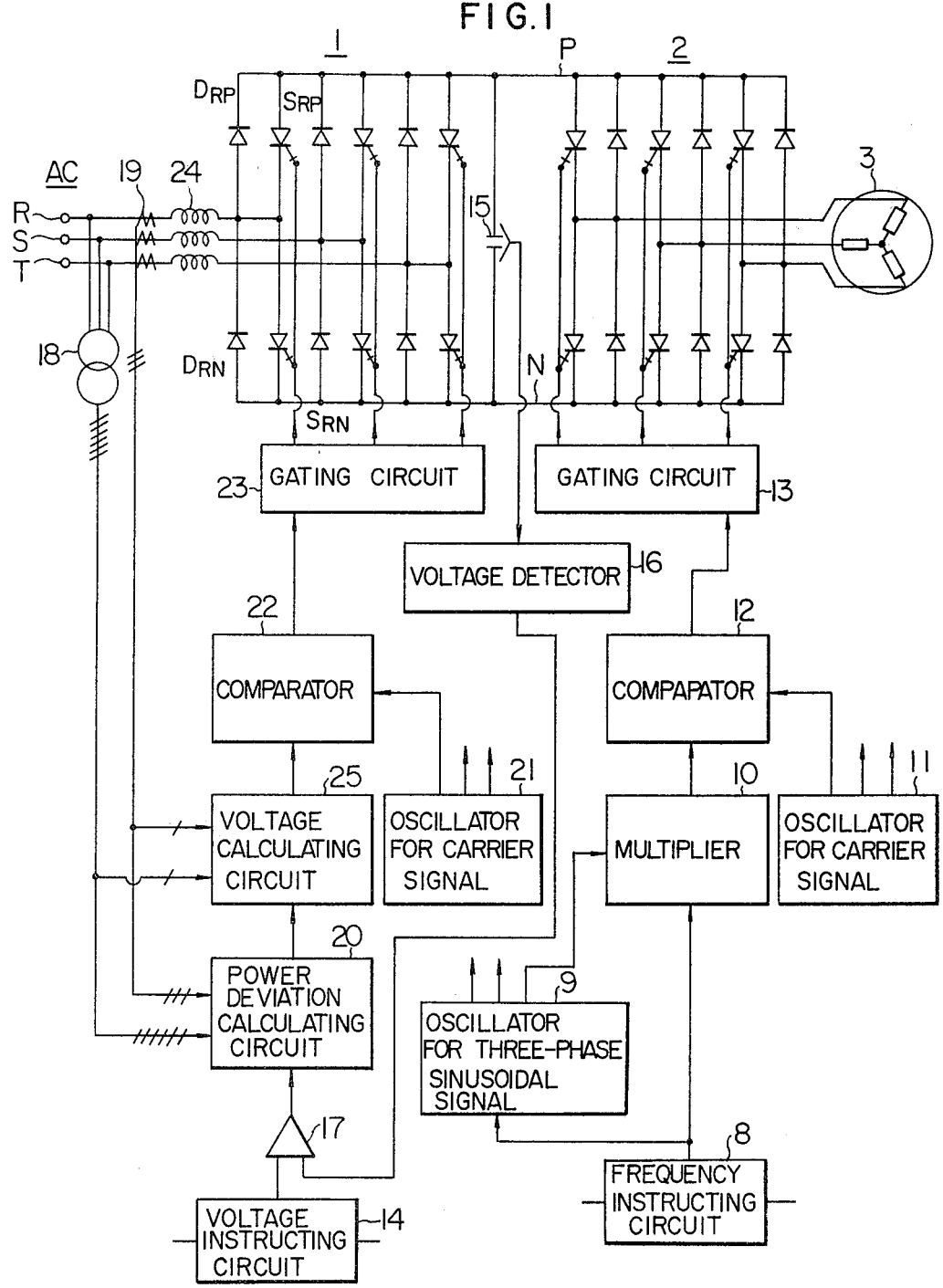
FIG. 1 shows schematically a circuit of a control apparatus as one embodiment of this invention.

In FIG. 1, reference numeral 1 designates a converter on the power source side (hereinafter referred to simply as PSSC), the PSSC being connected on its ac side with the terminals of R,S and T phases of the commercial ac source AC through reactors 24. The PSSC is also connected to its dc side with an inverter (PWM inverter) 2 on the motor side (hereinafter referred to briefly as MSI). In each of the PSSC 1 and the MSI 2, the anode of the GTO of an arm is connected with the cathode of the GTO of the opposite arm as shown in FIG. 1. A smoothing capacitor 15 is connected between the dc lines connecting the PSSC 1 and the MSI 2. The MSI, i.e. PWM inverter, 2 is connected on its ac side with an induction motor 3. Reference numeral 8 designates a frequency instructing circuit for specifying the voltage and the frequency of the output of the inverter 2; 9 an oscillator for generating a three-phase sinusoidal signal having a constant peak value and a variable frequency, the output frequency being proportional to the frequency instructing signal from the frequency instructing circuit 8; 10 a multiplier for making the product of the outputs of the frequency instruction circuit 8 and the oscillator 9 so as to change the amplitude of the output of the oscillator 9; 11 an oscillator for generating a carrier signal having a triangular waveform alternating between positive and negative polarities; 12 a comparator for comparing the carrier signal with the output of the multiplier 10 and for delivering a pulse width modulation signal (PWM signal) described later; and 13 a gating circuit for delivering gate signals for turning on and off the GTO's of the MSI 2. Here, it is to be noted that although three multipliers 10 and three comparators 12 must be provided in an actual circuit in accordance with the number of the phases of the induction motor 3, only one multiplier 10 and one comparator 12 are shown as provided for simplicity.

Reference number 14 designates a voltage instructing circuit for specifying the amplitude of the dc output voltage of the PSSC 1; 16 a voltage detector for detecting the voltage across the capacitor 15; 17 a voltage deviation amplifier for amplifying the deviation of the output voltage detected by the detector 16 from the voltage instructing signal of the voltage instructing circuit 14; 18 a transformer for taking out in an insulated manner the voltage of the ac source AC whereby voltage signals in phase with and out of phase by 90° from the respective phase voltages of the ac source AC may be delivered (such a transformer can be easily realized if two secondary windings are provided on a transformer); 19 a current detector for detecting the ac input current (instantaneous value) supplied to the PSSC 1; 20 a power deviation calculating circuit 25 a voltage calculating circuit for delivering an instruction signal for the fundamental component (instantaneous value) of the ac input voltage supplied to the PSSC 1 in accordance with the outputs of the transformer 18, the current detector 19 and the power deviation detector 20; 21 an oscillator for generating a carrier signal having a triangular waveform alternating between positive and negative polarities, the frequency of the carrier signal being several tens times the frequency of the ac source AC; 22 a comparator for comparing the output of the power deviation calculating circuit 20 with the carrier signal so as to deliver a PWM signal; and 23 a gating circuit for delivering gating signals for turning on and off the GTO's of the PSSC 1.

In FIG. 1, $S_{RP}$ and $S_{RN}$ respectively indicate the GTO's on the positive and negative sides in the phase R of the PSSC 1 and similarly $D_{RP}$ and $D_{RN}$ respectively designate the feedback diode on the positive and negative sides in the phase R of the PSSC 1.

FIG. 2 shows in detail the power deviation and the voltage calculating circuits 20 and 25. In FIG. 2, reference numeral 201 designates an effective power detector for detecting the effective component of the ac power source AC in accordance with the outputs of the transformer 18 and the current detector 19; 202 a reactive power detector for detecting the reactive component of the ac power source AC; 203 an effective power deviation amplifier for amplifying the deviation of the output of the amplifier 17 from the output of the effective power detector 201; 204 a multiplier for multiplying the output of the amplifier 203 by the voltage signals $e_{R'}$ out of phase by 90° from the respective phase voltages of the ac power source AC; 205 a reactive power instructing circuit for specifying the magnitude of the reactive part of the ac power source AC; 206 a reactive power deviation amplifier for amplifying the deviation of the output of the reactive power detector 202 from the reactive power instructing signal; 207 a multiplier for multiplying the output signal of the amplifier 206 by the voltage signals $e_R$ in phase with the respective phase voltages of the ac power source AC; and 208 an adder for adding the output of the multiplier 204 to that of the multiplier 207.

Figure 3A:
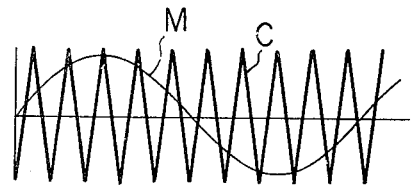
FIGS. 3A–3H show waveforms useful in explaining the operation of the embodiment of this invention.
Figure 3B:
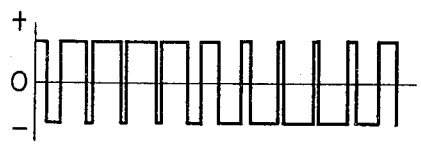

Now, the operation of the circuit shown in FIG. 1 will be explained. First, the operation of the PSSC 1 will be described with the aid of FIGS. 3A to 3H. In FIG. 3A are shown the modulation signal M as the output of the voltage calculating circuit 25 and the carrier signal C as the output of the oscillator 21. The comparator 22 makes comparison between the amplitudes of the signals M and C and as a result of this comparison the PWM signal as shown in FIG. 3B can be obtained. Gating signals are supplied to the GTO's $S_{RP}$ and $S_{RN}$ constituting the R phase of the PSSC 1 in accordance with the PWM signal. In particular, the gate signals are supplied in such a manner that the GTO $S_{RP}$ is turned on and the GTO $S_{RN}$ is turned off during the positive period of the PWM signal while $S_{RP}$ is off and $S_{RN}$ is on during the negative period.

Accordingly, the potential at the ac input terminal of the phase R of the PSSC 1 varies just like the PWM signal shown in FIG. 3B, provided that the neutral point in the dc circuit is assumed to be zero. This waveform contains the fundamental component which is in phase with the modulation signal M in FIG. 3A. And since the same control is performed on the phases S and T, voltages out of phase by 128 from one another are applied to the ac input terminals of the respective phases, so long as fundamental component alone is concerned.

Figure 3C:
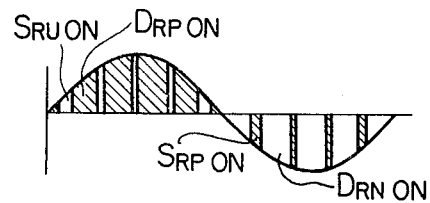
Figure 3D:
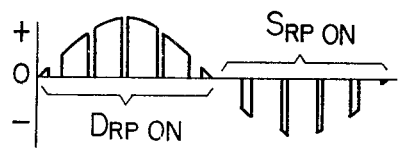
Figure 3E:
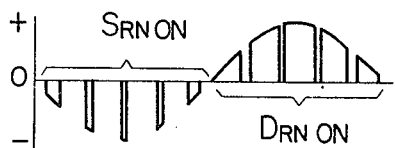

FIG. 3C shows the sinusiodal wave of the current (phase R) from the ac power source. FIG. 3C corresponds to the case where the current from the power source is in phase with the ac input voltage supplied to the PSSC 1 and where the PSSC 1 is under forward converting operation. The current from the power source flows into the dc circuit through the diode $D_{RP}$ or the GTO $S_{RN}$ during the positive half cycle and through the diode $D_{RN}$ or the GTO $S_{RP}$ during the negative half cycle. Since the turn-on and turn-off of the GTO's $S_{RP}$ and $S_{RN}$ are so controlled as described above, the direct current flowing from the PSSC 1 to the P side of the dc circuit is as shown in FIG. 3D while the direct current flowing from the N side of the dc circuit to the PSSC 1 is as shown in FIG. 3E. Namely, on the average, the direct current flows from the PSSC 1 to the MSI 2 through the P line of the dc circuit while the direct current flows from the MSI 2 to the PSSC 1 through the N line of the dc circuit. Although the direct current is in the shape of a pulse train as shown in FIG. 3D or 3E, the ripple factor of this current, which is the resultant of the three phase components, will be smaller than that of a direct current for a single phase. The effect of ripples on the MSI 2 is eliminated by the capacitor 15.

Figure 3F:
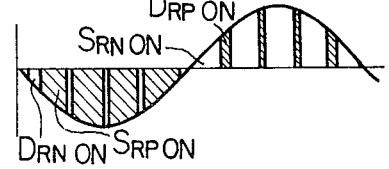
Figure 3G:
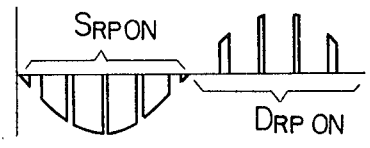
Figure 3H:
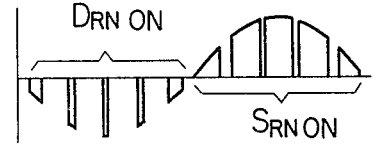

On the other hand, when a reverse converting operation is performed, the corresponding currents flow as shown in FIGS. 3F to 3H. FIG. 3G and 3H respectively show the direct currents flowing through the P and N lines of the dc circuit. As shown, the direct currents in the reverse operation are opposite in polarity to those in the forward operation. As described above, the PSSC 1 can perform both forward and reverse operations. The change-over between the forward and the reverse conversion operation can be effected by controlling the amplitude and the phase of the ac input voltage to the PSSC 1.

This change-over operation will be explained below. The detector 201 of the calculating circuit 20 performs the following calculation to detect the effective power of the ac power source AC.

$$P = e_R \cdot i_R + e_S \cdot i_S + e_T \cdot i_T \propto E_o I \cos \psi \tag{1}$$

, where $e_R$, $e_S$ and $e_T$ represent the respective phase voltages (instantaneous values); $i_R$, $i_S$ and $i_T$ the respective phase currents (instantaneousl values); $E_o$ the vector amplitude of the phase voltage; I the vector amplitude of the phase current; and $\psi$ the phase of the current vector (the angle of lag of the current vector with respect to the voltage vector). The signal carrying the effective power P and the output signal of the amplifier 17 are sent to the amplifier 203, which delivers the output representing the deviation of one signal from the other. The output of the amplifier 203 is applied to the multiplier 204 of the voltage calculating circuit 25. The remaining input terminal of the multiplier 204 receives the voltage signal $e_{R'}$ out of phase by 90° from the voltage signal $e_R$. Accordingly, the multiplier 204 can deliver an output signal having the same phase as the voltage signal $e_{R'}$ and an amplitude proportional to the deviation of the effective power.

On the other hand, the detector 202 performs the following calculation to detect the reactive power Q of the ac power source AC.

$$Q = e_{R'} \cdot i_R + e_{S'} \cdot i_S + e_{T'} \cdot i_T \propto E_o I \sin \psi \tag{2}$$

, where $e_{R'}$, $e_{S'}$ and $e_{T'}$ represent the voltage out of phase by 90° respectively from the phase voltage $e_R$, $e_S$ and $e_T$.

The reactive power Q and the output signal of the reactive power instructing circuit 205 are sent to the amplifier 206, which delivers an output corresponding to the deviation of the reactive power Q from the output of the circuit 205, the output of the amplifier 206 being applied to the multiplier 207. The remaining input terminal of the multiplier 207 receives the voltage signal $e_R$ so that the multiplier 207 can deliver a signal having the same phase as the voltage signal $e_R$ and an amplitude proportional to the deviation of the reactive power.

FIGS. 4A and 4B show in vector diagram the relationship among the output voltage $E_o$ of the ac power source AC, the ac input voltage $E_t$ to the PSSC 1 and the current I from the ac power source AC. In FIG. 4A, the current I lags behind the voltage $E_o$ by an angle $\psi$ and the voltage $E_t$ is lower by the reactance drop XI (X represents the reactance of the reactor 24) than the voltage $E_o$.

To cause the power factor at the receiving end to equal 1.0, it is necessary that $\psi=0$. FIG. 4B shows the vector diagram representing the condition that $\psi=0$. The comparison of FIG. 4A with FIG. 4B shows the following facts:

(1) In the case where $\psi>0$ in FIG. 4A, that is, in the case of lagging phase, that component of the voltage $E_t$ which is in phase with the voltage $E_o$ is smaller than the voltage $E_o$, and (2) in the case where $\psi<0$, that is, in the case of leading phase, the above said component is greater than $E_o$, whereas in the case where $\psi=0$ the component equals $E_o$.

Accordingly, it is possible to control the power factor to equal 1.0, that is, to control the angle $\psi$ in such a manner that $\psi=0$, (1) by controlling that component of $E_t$ which is in phase with $E_o$, to increase if $\psi>0$ and (2) by controlling the component to decrease if $\psi<0$.

The foregoing description corresponds to the case where the PSSC 1 performs the forward operation, but the same is true for the case of the PSSC 1 being inversely operated.

FIGS. 5A and 5B show the case where the PSSC 1 performs the reverse operation. In FIG. 5A where $\psi > \pi$, that component of the voltage $E_t$ which is in phase with the voltage $E_o$, is greater than $E_o$ whereas the component equals $E_o$ if $\psi = \pi$ as shown in FIG. 5B. If $\psi < \pi$, it follows naturally that the component is smaller than $E_o$. Therefore, the control such that $\psi = \pi$, can be realized if the above component is appropriately decreased when $\psi > \pi$, and increased when $\psi < \pi$.

The above way of control is summarized in terms of sin $\psi$ as follows.

(1) If sin $\psi > 0$, that is, $0 < \psi < \pi$, that component of $E_t$ is in phase with $E_o$ is increased and (2) if sin $\psi < 0$, that is, $-\pi < \psi < 0$, the component is decreased.

Thus, whether the component of $E_t$ in phase with $E_o$ should be increased or decreased, is uniquely determined depending on the sign of the quantity sin $\psi$.

Therefore, the power factor at the receiving end can be kept at 1.0 if the increase or decrease of the component of $E_t$ in phase with $E_o$ and the rate of the increase or decrease are controlled in view of the value of sin $\psi$.

The above control is achieved by the cooperation of the reactive power detector 202, the reactive power instructing circuit 205, the amplifier 206 and the multiplier 207. Namely, the detector 202 detects a signal proportional to I sin $\psi$ and the deviation of this signal from the instructing signal (zero voltage signal if power factor is 1.0) from the reactive power instructing circuit 205 is amplified by the amplifier 206 having a large gain. Then, the multiplier 207 makes a product of the reactive power deviation signal from the amplifier 206 and the voltage signal $e_R$ in phase with the corresponding phase voltage of the ac power source AC.

From the multiplier 207 is delivered the voltage signal which is in phase with the corresponding phase voltage of the ac power source and varies in accordance with the above described restrictions. The thus obtained voltage signal is added in the adder 208 to the output signal from the multiplier 204 and the output of the adder 208 is then applied to the comparator 22. In this way, the ac input voltage $E_t$ to the PSSC 1 and therefore the component of $E_t$ in phase with $E_o$, can be controlled, whereby the power factor can be controlled to be 1.0 ($\psi=0$ or $\pi$).

The operation for controlling the change-over between the forward and the reverse operations of the PSSC1 will be described below. First, the relationship among the forward and the reverse operations of the PSSC 1 and the ac voltage $E_t$ of the PSSC 1 will be explained.

The comparison of FIG. 4B with FIG. 5B shows that the ac input voltage $E_t$ lags in phase behind the voltage $E_o$ of the ac power source in the case of the forward operation while $E_t$ leads $E_o$ in the case of the reverse operation. In other words, the change-over from one operation to the other takes place in accordance with the change in the sign of the component of $E_t$ perpendicular to $E_o$, from negative to positive or conversely. Namely, the PSSC 1 performs (1) the forward operation if the component of $E_t$ perpendicular to $E_o$ has a positive polarity (i.e. $-(\pi/2) < \psi < (\psi/2)$, and (2) the reverse operation if the component has a negative polarity (i.e. $(\pi/2) < \psi < (3/2)\pi$).

The above statements can be restated in terms of cos $\psi$ as follows.

(1) The forward operation corresponds uniquely to the condition that cos $\psi \geq 0$. The component of $E_t$ perpendicular to $E_o$ is so controlled as to have a positive polarity ($E_t$ lagging in phase behind $E_o$) for the forward operation to be performed.

(2) The reverse operation corresponds uniquely to the condition that cos $\psi < 0$. The component is so controlled in this case as to have a negative polarity ($E_t$ leading $E_o$ in phase) for the reverse operation.

These controls are achieved by the cooperation of the effective power detector 201, the amplifier 203 and the multiplier 204. First, the effective power proportional to I sin $\psi$ is detected by the detector 201. The output signal of the detector 201, containing the information about the effective power, and the signal from the amplifier 17 are compared and the deviation of the former from the latter is amplified, by the amplifier 203. In the case where the PSSC 1 performs the forward operation, the voltage across the capacitor is normally smaller than the instruction voltage supplied from the voltage instruction circuit 14 so that the deviation amplifier 17 delivers a voltage deviation signal having a positive polarity. In this case, if the output of the effective power detector 201 is smaller than the voltage deviation signal, the amplifier 203 delivers an output of positive polarity. On the contrary, if the reverse condition is established, the output of the amplifier 203 is of negative polarity.

Then, the multiplier 204 multiplies the output signal of the amplifier 203 with the voltage signal $e_{R'}$ which is out of phase by 90° from the voltage $E_o$. Accordingly, the multiplier 204 delivers a signal whose amplitude varies in accordance with the output of the amplifier 203 and which is 90° out of phase from the voltage $E_o$.

In the case where the PSSC 1 performs the reverse operation, the voltage across the capacitor 15 temporarily rises so that the amplifier 17 delivers the voltage deviation signal having a negative polarity and the detector 201 delivers the effective power signal having a negative polarity. When the absolute value of the output of the detector 201 exceeds the voltage deviation signal from the amplifier 17, the output of the amplifier 203 has a negative polarity and its amplitude decreases. On the contrary, when the absolute value of the output of the amplifier 201 becomes smaller than the voltage deviation signal from the amplifier 17, the amplifier 203 delivers an output of negative polarity with increasing amplitude. As a result, throughout the reverse operation, the multiplier 204 delivers an output signal whose amplitude varies in accordance with the output of the amplifier 203 and whose phase is opposite to that of the voltage $e_{R'}$, that is, whose phase leads that of the voltage $E_o$ by 90°.

The output of the multiplier 204 is added in the adder 208 to the signal from the multiplier 207 and the output of the adder 208 is supplied to the comparator 22. Thus, the ac input voltage supplied to the PSSC 1 (90° out of phase from $E_o$) is controlled in accordance with the output of the multiplier 204 so that the change-over between the forward and the reverse operations and the effective component ($\propto I \cos \psi$) of the output of the ac power source are controlled in accordance with the above described vectorical relationships. In conclusion, the effective power is to be controlled in accordance with the output of the amplifier 17.

Now, the operation of the amplifier 17 will be described. When the voltage across the capacitor 15 is lower than the voltage instruction signal, the output of the amplifier 17 positively increases while when the voltage across the capacitor 15 is higher than the voltage instruction signal, the output of the amplifier 17 negatively decreases. In the case where the PSSC 1 performs the forward operation, if the former condition is established, the effective power of the ac source is so controlled as to increase in accordance with the operations of the circuit elements posterior to the amplifier 203. Accordingly, the dc output current from the PSSC 1 increases up to a value higher than that required by the MSI 2 so that charging current flows into the capacitor 15 to charge it up to a predetermined voltage. On the other hand, if the latter condition is established, the voltage across the capacitor falls and is controlled to a predetermined level.

In the case where the PSSC 1 performs the reverse operation, the polarity of the output of the amplifier 17 is negative and when the voltage across the capacitor 15 is lower than the set value, the absolute value of the output decreases while in the contrary condition the absolute value increases. As a result, under the former condition where the voltage across the capacitor 15 is lower than the set value, the effective power of the ac power source is so controlled as to decrease so that the ac input current supplied to the PSSC 1 becomes smaller than the direct current delivered by the MSI 2. Consequently, charging current flows into the capacitor 15 to increase the voltage across it up to a predetermined level. Under the latter condition, on the other hand, where the voltage across the capacitor 15 is higher than the set value, the voltage across the capacitor 15 falls to a predetermined level. Thus, the voltage across the capacitor 15 is controlled to predetermined levels throughout the forward and the reverse operations of the PSSC 1.

The foregoing description is given exclusively to the PSSC 1, but now is the time for describing the operation of the MSI 2. As in the case of the PSSC 1, the output voltage of the MSI 2 is controlled in accordance with the input signal supplied to the comparator 12.

The multiplier 10 multiplies the output of the frequency instruction circuit 8 by the output of the oscillator 9 and the output of the multiplier 10 is supplied to the comparator 12. Accordingly, the output voltage of the MSI 2 is so controlled that its amplitude and frequency may be both proportional to those of the frequency instruction signal. As well known, if the frequency specified by the instruction circuit 8 is higher than the synchronous speed of the motor 3, the synchronous machine 3 performs a motor operation while if the set frequency is lower than the synchronous speed of the machine 3, it performs a generator operation. In these cases, the MSI 2 performs the reverse and the forward operations, respectively, the speed of the motor 3 being controlled in accordance with the frequency instruction signal.

In the reverse operation of the MSI 2, direct current flows from the PSSC 1 toward the MSI 2 while in the forward operation direct current flows from the MSI 2 toward the PSSC 1. In each of these cases, the voltage across the capacitor 15 is controlled to a constant value, as described above, so that the output direct current from the PSSC 1 is always in equilibrium with the direct current input to the MSI 2. Namely, the PSSC 1 and the MSI 2 performs the opposite operations relative to each other.

As described above, the control apparatus according to this invention can control not only a motor operation but also a regenerative operation and with this control apparatus the power factor of the ac power source can be always kept at 1.0.

Moreover, since both the PSSC 1 and the MSI 2 are of PWM type, the current flowing through the motor is sinusoidal, free from torque ripples and higher harmonic components.

As described above, according to this invention, a regenerative operation can be effected and also a high power factor can be attained.

In the above described embodiment, the PSSC 1 and the MSI 2 comprise GTO's, but this invention can be equally applied to the case where transistors or ordinary thyristors are used in place of GTO's.

We claim:

1. An apparatus for controlling an ac motor, comprising:

(a) a first PWM inverter for converting an ac voltage from an ac power supply to a dc voltage;

(b) a second PWM inverter for inverting the dc voltage output of said first inverter to an ac voltage which is variable in amplitude and frequency;

(c) an ac motor driven by said second inverter;

(d) a capacitor connected between dc circuits connecting said first inverter to said second inverter;

(e) frequency control means for controlling the ignition of said second inverter in accordance with a frequency instruction signal;

(f) power detector means for detecting an available power and a reactive power from said ac power supply;

(g) means for setting an amplitude of the reactive power at a point of detecting a power output from said ac power supply to a predetermined value;

(h) means for setting an amplitude of the voltage output of said dc circuits to a predetermined value;

(i) means for detecting the voltage output of said dc circuts;

(j) power control means for executing the ignition control of said first inverter, said ignition control including the steps of adjusting an input ac voltage component of said first inverter, which has a phase difference of 90° with respect to that of the output voltage of said ac power in accordance with a deviation between an instruction value and an actual value of said available power which correspond to a set value and an actual value of said dc circuit voltage, and also adjusting the input ac voltage component of said first inverter, which has the same phase as that of the output voltage of said ac power supply in accordance with a deviation between a set value and an actual value of said reactive power.

2. An apparatus for controlling an ac motor, comprising:

(a) a first PWM inverter for converting an ac voltage from an ac power supply to dc voltage;

(b) a second PWM inverter for converting a dc voltage output of said first inverter to an ac voltage which is variable in amplitude and frequency;

(c) an ac motor driven by said second inverter;

(d) a capacitor connected between dc circuits which connect said first and second inverters;

(e) frequency control means for controlling the ignition of said second inverter in accordance with a frequency instruction signal;

(f) power detector means for detecting an available power and a reactive power from said ac power supply;

(g) means for setting an amplitude of said available power at a point of detecting an output power from said ac power supply to a predetermined value;

(h) means for setting an amplitude of a voltage output from said dc circuit to a predetermined value;

(i) means for detecting a voltage output from said dc circuits;

(j) means for generating a first sine wave voltage reference signal having a phase difference 90° from that of the output voltage of said ac power supply and a second sine wave voltage reference signal having the same phase as that of said ac power supply, said voltage reference signal generating means including (1) first amplitude adjusting means for adjusting an amplitude of said first sine wave voltage reference signal in accordance with a deviation between an instruction signal and an actual value of an available power;

(2) second amplitude adjusting means for adjusting an amplitude of said second sine wave voltage reference signal in accordance with a set value and an actual value of said reactive power;

(3) voltage adjusting means for producing a sine wave voltage instruction signal from said two voltage reference signals which are amplitude-modulated by said first and second amplitude adjusting means (4) gate control means for controlling the ignition of said first inverter in accordance with said sine wave voltage instruction signal.

3. An apparatus for controlling an ac motor according to claim 2, wherein said gate control means comprises comparator means for comparing a carrier signal with said sine wave instruction signal to produce a PWM signal and means for producing a pulse output in accordance with said PWM signal to control the ignition control of said first inverter.

* * * * *